United States Patent [19]
Mollard

[11] 3,973,655
[45] Aug. 10, 1976

[54] INERTIA BRAKING DEVICE FOR A ROAD TRAILER, WITH CANCELLATION OF THE BRAKING ACTION WHEN REVERSING

[75] Inventor: Maurice Mollard, Louhans, France
[73] Assignee: F.T.F., Louhans, France
[22] Filed: Mar. 7, 1974
[21] Appl. No.: 449,168

[30] Foreign Application Priority Data
Mar. 20, 1973 France .............................. 73.11232

[52] U.S. Cl. ............................... 188/328; 188/112; 188/325
[51] Int. Cl.² ........................................ F16D 51/22
[58] Field of Search ............ 188/82.1, 112, 74, 325, 188/327, 328, 329, 330, 335

[56] References Cited
UNITED STATES PATENTS

| | | | |
|---|---|---|---|
| 2,145,406 | 1/1939 | Schroter et al. .................... | 188/112 |
| 2,973,839 | 3/1961 | De Puydt et al .................... | 188/327 |
| 3,144,101 | 8/1964 | Hahn .................................. | 188/112 |
| 3,870,131 | 3/1975 | Firth .................................. | 188/325 |

FOREIGN PATENTS OR APPLICATIONS

| | | | |
|---|---|---|---|
| 1,933,435 | 1/1970 | Germany ............................ | 188/112 |

Primary Examiner—Trygve M. Blix
Assistant Examiner—Edward R. Kazenske
Attorney, Agent, or Firm—Sughrue, Rothwell, Mion, Zinn & Macpeak

[57] ABSTRACT

The invention relates to a braking device for a road trailer, which device has a zero braking action when the driving vehicle is reversing.

1 Claim, 4 Drawing Figures

INERTIA BRAKING DEVICE FOR A ROAD TRAILER, WITH CANCELLATION OF THE BRAKING ACTION WHEN REVERSING

The present invention relates to an inertia braking device of the kind to be mounted for safety on road trailers and, in particular, on touring caravans.

It is known that, on grounds of safety, the wheels of a trailer or a caravan must be provided with brakes adapted to be applied automatically in the event of a driving difficulty, or if the trailer tends to uncouple itself.

A known system consists in providing the trailer or the caravan with a telescopic coupling pole, the sliding part of which is connected to the brakes of the wheels of the trailer through a mechanical system. When the trailing car is hauling the caravan, the telescopic pole is in its extended position, and the wheels of the caravan are able to turn freely. On the other hand, if the caravan tends through inertia to run faster than the trailing car, the telescopic pole becomes retracted, whereby the braking of the wheels of the caravan is actuated. This system works satisfactorily on a road.

On the other hand, when the driver manoeuvres to park his car or his caravan, he executes a series of forward and backward motions. To prevent the wheels of the caravan from being systematically braked every time the driver reverses, a locking system must be provided, which the driver actuates manually before manoeuvring. With the known systems, it is therefore found that the driver must alight from his seat to go and lock manually the safety device on the pole of his caravan, and then climb into his car again. The device remains locked while the driver reverses, but as soon as the car moves forward again the locking system releases itself, so that the driver must stop his car, alight again therefrom, and re-engage the locking system manually. Such operations are both time-consuming and tedious.

The object of the present invention is to obviate such drawbacks by providing a trailer or a caravan with a mechanical inertia braking system which ensures a complete safety during the normal operation with the car running forward, but cuts out any braking action when the car is being reversed.

A braking device according to the invention, adapted to be fitted to at least one arc-shaped friction jaw housed inside a rotary drum, is characterized in that it comprises two parts, that is, a first movable part constituted by the friction lining, a second part in the shape of an arc of a circle, one end of which is linked on the fixed brake flange, while the other end is adapted to be subjected to the action of the braking push rod, said second part supporting the friction lining through two flanges disposed on either side of a web, said three parts being each in the shape of an arc of a circle, and provided with means which enable the lining to move with respect to the second part.

According to another feature of the invention, the two flanges are fixed on the second part while the lining is fixed on the web, or else the lining is fixed on the two flanges and the web is fixed on the second part.

According to an additional feature of the invention, the means which enable the lining to move with respect to the second part are constituted by at least two oval ports drilled through the web, while the two flanges are interconnected by at least two pins through said two ports, the sections of the ports and the fingers being such that some play remains between the lining and the second part.

According to a modification, said means are constituted by at least two pins which project on either side of the web to which they are fixed, the ends of said pins being introduced into at least two pairs of oval ports drilled through the two flanges, the sections of the pins and the ports being such that they allow some play between the lining and the second part.

According to another feature of the invention, the longitudinal median line of the oval ports lies at an angle to the curve of the friction lining, which angle enables said ports to move the lining away from the centre of the brake when the jaw is not self-engaging, and, on the contrary, to move said lining closer to said centre when the jaw is self-engaging.

According to another feature of the invention, the length of the oval ports is such that the magnitude of the possible movement of the friction lining with respect to the two flanges supporting it is higher than, or at least equal to, the magnitude defined by the whole movement of the safety inertia braking drive of the telescopic pole of the trailer.

An additional feature of the invention consists in using a brake including two jaws inside the drum, the first jaw being of the above-mentioned type, while the second jaw is of a current conventional type, wherein the lining portion and the supporting web portion are of integral one-piece construction with one end of the web portion pivoted about a fixed axis, while its opposite end is subjected to the action of a push rod. In this case, the arrangement is such that the engaging jaw is the jaw of a current conventional one-piece type when the drum is turning during the forward motion of the trailor, while, on the contrary, the engaging jaw is the jaw according to the invention when the drum turns in the direction corresponding to the reverse motion of the trailer. The engaging jaw is thus set back during said reverse motion, whereby any braking action is prevented.

A feature of the invention consists in mounting a parking brake operated by a hand lever to brake the mobile jaw, so as to make the trailer fast as regards both the forward direction and the rearward direction when said trailer is parked. To this end, through a device of a known type, which includes a spring compressed through the hand lever and acting on the control rod for the brakes, said hand lever allows obtaining a longer travel and an additional pull of said brake controlling rod, which ensures the braking of the friction lining, the web of which bears on the fingers of its two supporting flanges through the ends of its oval ports.

The accompanying drawing, which is given by way of non-limiting example, will enable the features of the invention to be better understood.

Figure 1:
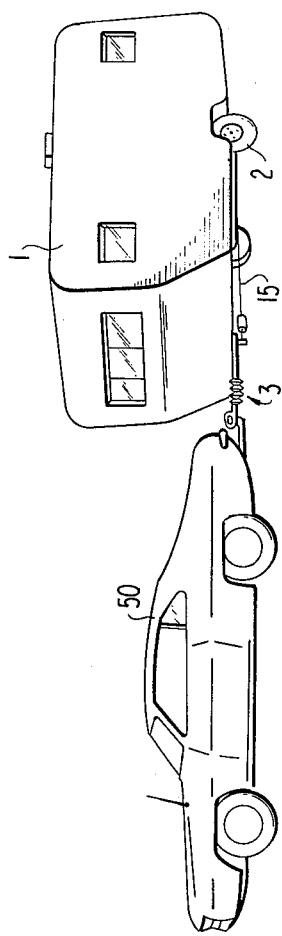
FIG. 1 is a general view of a caravan provided with the braking device according to the invention, and fitted to the rear of a car.

FIG. 1 shows a caravan or trailer 1 coupled to a towing vehicle 50 by means of a hitch which includes a telescopic operating device 3 which in turn is coupled to the wheels 2 of the trailer by a brake control rod 15.

Figure 2:
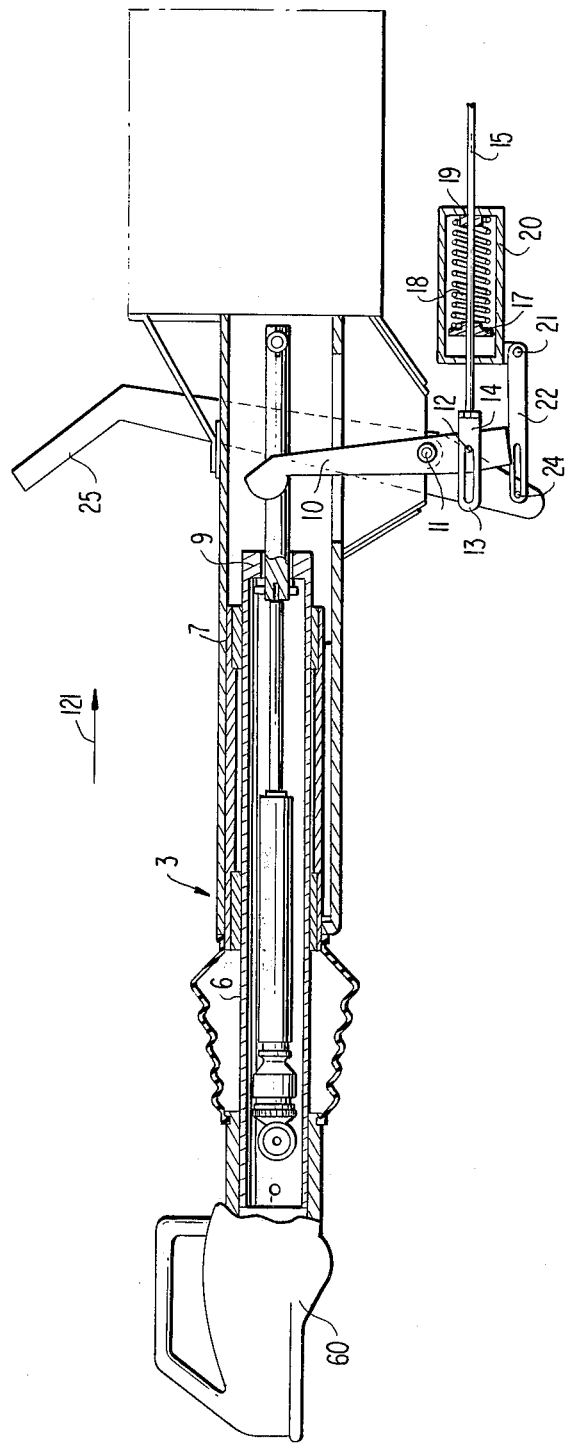
FIG. 2 is a detailed view of the pole of the caravan.

The operating device 3 and the control rod 15 are shown in detail in FIG. 2. The telescopic operating device is comprised of an outer sleeve 7 secured to the trailer and an inner sleeve 6 which is secured to the coupling element 60 of the hitch. The innermost end of the sleeve 6 is provided with an apertured head 9 which is adapted to engage one end of a lever 10 pivoted on an extension of the trailer at 11. A pin 12 is mounted on the opposite end of the lever 10 and is located in a slot 13 in the member 14 which is secured to the end of the control rod 15. The opposite end of the control rod 15 is operatively connected to the brake shoe expanding device 26 by any suitable means.

The lever 25 is a conventional hand-brake lever which is also capable of actuating the control rod to apply the brakes on the wheels 2 when the trailer 1 is uncoupled from the towing vehicle 50. The hand-brake lever 25 is pivoted on the same axis 11 as the lever 10 but is provided with a pin 24 which is disposed at a greater radial distance from the axis 11 than the pin 12 which is mounted on the lever 10. The pin 24 is disposed in the slot of a link 22 which is coupled to a sleeve 20 by means of a pin connection 21. The sleeve 20 is slidably mounted on the control rod. A spring 18 is disposed about the control rod within the sleeve 20 and bears against a fixed abutment 17 on the control rod 15 at one end and against the abutment 19 at the other end which is fixed to the sleeve 20. Thus, it is possible to obtain a greater degree of movement of the pin 24 than the pin 12 and exert an additional pull on the brake controlling rod than is possible with the actuation of the lever 10. This additional pull of the brake control rod 15 insures the frictional engagement of both braking shoes with the brake drum as will be pointed out more specifically hereinafter.

The brake assembly according to the present invention includes a conventional one-piece brake shoe comprised of a web 30 with the lining 32 being integrally secured thereto and a two-part shoe generally designated at 29. The two shoes are each pivoted at one end on opposite ends of a bar 47 which is secured to a fixed support 48. A brake shoe spreading device 26 of any suitable type is interposed between the opposite ends of the brake shoes for moving the brake shoes outwardly toward the brake drum, not shown. The brake shoes are held against the bar 47 and the expanding device 26 by means of springs 39.

Figure 3:
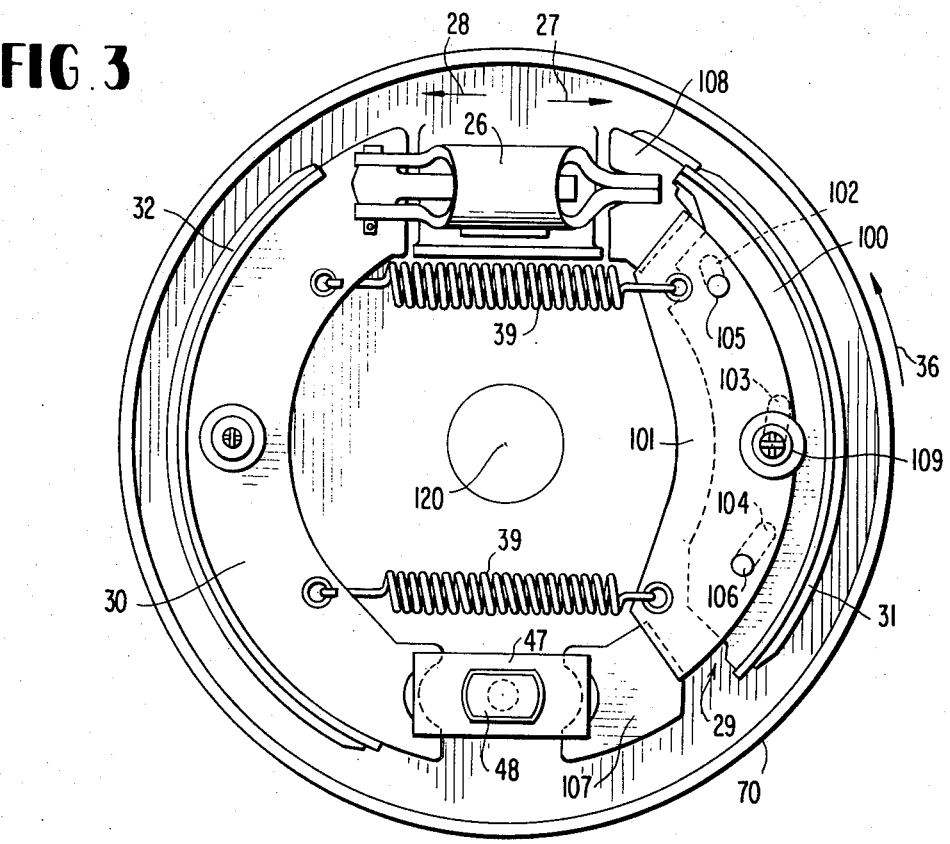
FIG. 3 is a view of the brake according to the invention when the jaw is set back during a backing manoeuvre.
Figure 4:
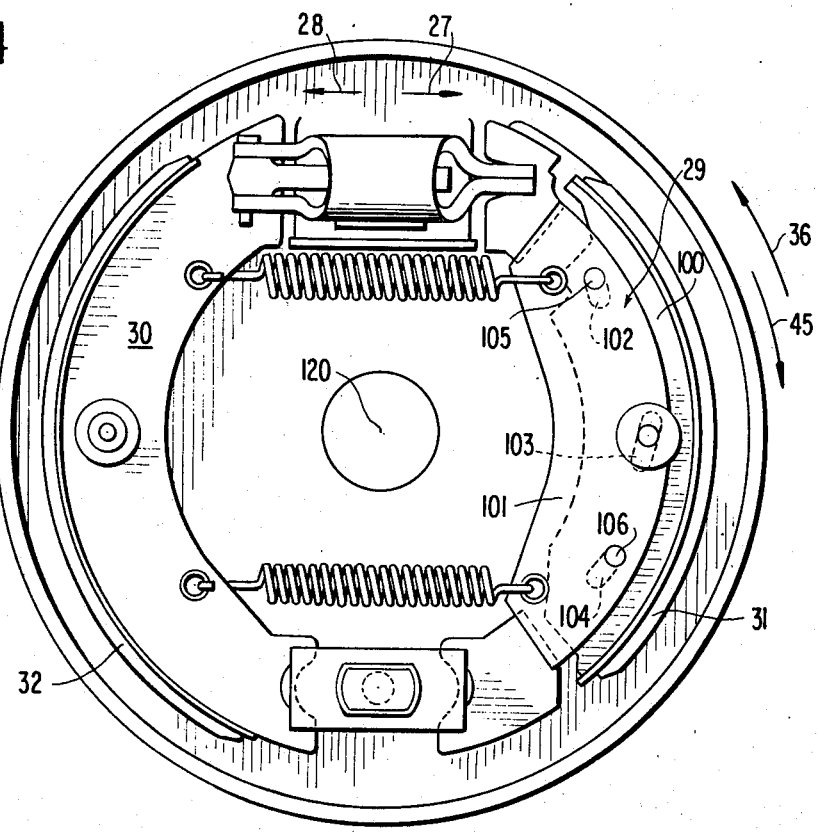
FIG. 4 is a view of the brake according to the invention during the braking upon moving forward.

The brake shoe 29 is comprised of two parts, namely:
a first movable part constituted by a web 100 which supports the friction lining 31, said web including elongated oval ports 102, 103, and 104;
a second movable part constituted by two flanges 101 only one of which is visible in FIGS. 3 and 4 disposed on either side of the web 100, and including pins 105 and 106 converted to and extending between said flanges, said two flanges being interconnected by members 107 and 108 mounted at their ends by any suitable means.

The web 100 includes, a device 109 which allows in a known way the holding of the friction lining 31 with respect to the rotary drum (not shown).

The operation is as follows:

When the brakes are applied to the car 50 when travelling in the forward direction, the sliding part 6 of the pole 3 of the caravan pushes back the lever 10. The latter pulls the control rod 15, whereby the jaws are caused to move away from each other in the direction of the arrows 27 and 28 respectively. The friction lining 31 is thus driven in the direction of the arrow 36 (FIG. 3). The ends of the ports 102 and 104 of the web 100 strike then against the pins 105 and 106, and stop the movement of the friction lining 31. Said elongated ports 102 and 104 define an angle such with the tangent to the curve of the friction lining 31 that said lining moves away from the centre 120 of the brake. On account of said movement and the supports provided by the pins 105 and 106, the lining 31 is thus able to brake the rotary drum 70. Since the drum is rotating in the direction of the arrow 36 the lining 32 of the conventional brake shoe will engage the drum in a self-engaging direction so that both linings 31 and 32 will be disposed in firm frictional engagement with the drum.

When the car is being backed, the sliding portion 6 of the pole 3 acts again on the control rod 15. The jaws 29 and 30 are moved away from each other along the arrows 27 and 28 respectively, as previously described. However, the friction lining 31 is driven in the direction of the arrow 45 (FIG. 4), which corresponds to the direction of rotation of the wheels during the reversing manoeuvre. The other ends of the elongated ports 102 and 104 come to strike against the fingers 105 and 106, whereby the friction lining 31 is drawn nearer to the centre 120 of the brake, and is thus set aside in a manner such that no braking stress occurs. Although the friction lining 32 of the conventional one-piece shoe is moved into engagement with the brake drum the direction of rotation of the brake drum will be in the direction of the arrow 45 so that self-engaging action will not take place and the frictional force will be such as to not interfere with the maneuvering of the trailer in the reverse direction.

On the other hand, if the hand brake lever 25 is pushed back in the direction of the arrow 121 (FIG. 1), this causes the spring 18 to be compressed through the casing 20. Such compression generates a pull on the rod 15 and an adequate travel of the latter through the stop fixed to said rod, whereby the parking braking is ensured both forwards and backwards. The jaws 29 and 30 are thus moved away from each other in the direction of the arrows 27 and 28 respectively, to a greater extent than by the movement of the sliding portion 6 inside the pole 3. If the caravan were then tending to move backwards, the friction linings 31 and 32, which would be driven in the direction of the arrow 45, would then be able to brake the rotary drum 70, since the fingers 105 and 106 would serve as stroke-end stops for the lining 31 (FIG. 4). In the same way, if the caravan were tending to move forward, the friction linings 31 and 32, which would be driven in the direction of the arrow 36, would be able to brake the rotary drum, owing to the fact that the lining 31 bears on the fingers 105 and 106.

A brake is thus obtained, which is adapted to hold the caravan fast, which is one of the requirements for a parking brake.

I claim:

1. A braking device for trailers comprising a brake shoe supporting plate adapted to be fixedly mounted with respect to a trailer, a first one-piece brake shoe, a second two-part brake shoe, means for pivotally mounting one end of each of said brake shoes on said plate, actuator means disposed between the opposite ends of said brake shoes for moving said opposite ends of said brake shoes away from each other about said pivot means into engagement with a drum, said first brake shoe having a friction lining integral therewith, said two-part brake shoe comprising a first part pivoted on said pivot means and a second part having a friction lining integral therewith being movable relative to said first part, and lost-motion connecting means between said first and second parts, said lost-motion connecting means comprising elongated slot means disposed in one of said parts and pin means connected to the other of said parts and extending through said elongated slot means, said elongated slot means being disposed at an acute angle relative to a line which is tangent to a curve parallel to the circumference of the lining of the two-part brake shoe with the end of said slot means closest to said pivot means being disposed radially inwardly with respect to the opposite ends of said slot means whereby engagement of the said two-part brake shoe with a forwardly rotating drum will cam said second part of said two-part brake shoe radially outwardly relative to said first part into firm engagement with the drum while said one-piece shoe is brought into self-engagement with the drum and engagement of said two-part brake shoe with a brake drum rotating in the reverse direction will cam said second part of said two-part brake shoe radially inwardly relative to said first part while said one-piece shoe is overridden by the drum to render said shoes ineffective to brake the trailer.

* * * * *